United States Patent
Kurer

[15] 3,656,236
[45] Apr. 18, 1972

[54] DENTURE RETENTION METHOD

[72] Inventor: Peter F. Kurer, 39 Deansgate, Cheadle, England

[22] Filed: Oct. 16, 1970

[21] Appl. No.: 81,394

[52] U.S. Cl............................................................32/2
[51] Int. Cl..........................................................A61c 13/00
[58] Field of Search..................................................32/2, 8, 5

[56] References Cited

UNITED STATES PATENTS 3,085,334  4/1963  Bischof et al. ...............................32/2

Primary Examiner—Robert Peshock
Attorney—Wolf, Greenfield & Sacks

[57] ABSTRACT

A dental procedure for providing a secure anchor in the mouth to which a denture can be attached utilizes a temporary post having a threaded shank carrying a cylindrical head. A natural tooth root is drilled and tapped to form a threaded hole in which the shank of the temporary post is received. An impression is taken of the face of the tooth root and the protruding head of the temporary post. The temporary post is removed and a cap, prepared from the impression and having a hole in it where the head projection occurred, is secured to the tooth root. A permanent post is then utilized which has its head in the form of a denture retainer atop a threaded shank. The threaded shank of the permanent post, after being coated with dental cement, is inserted through the hole in the cap and is screwed into the tooth root. With the shank fully inserted, the head of the post overlaps the hole in the cap, sits upon the cap to seal that hole, and aids in maintaining the cap in place on the tooth root.

2 Claims, 11 Drawing Figures

PATENTED APR 18 1972 3,656,236
SHEET 1 OF 2
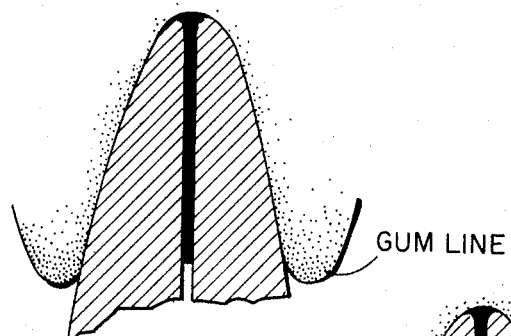
FIG. 1 GUM LINE
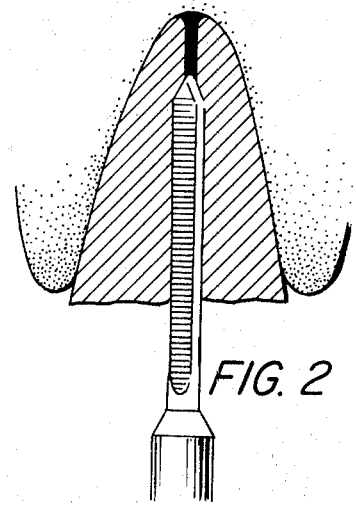
FIG. 2
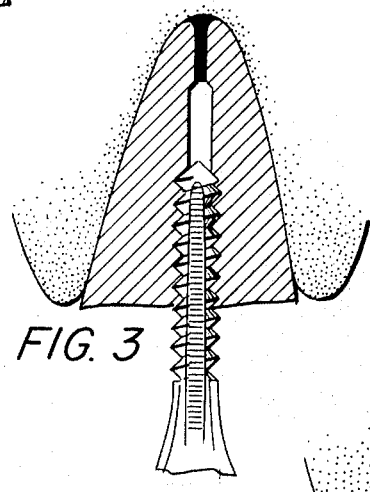
FIG. 3
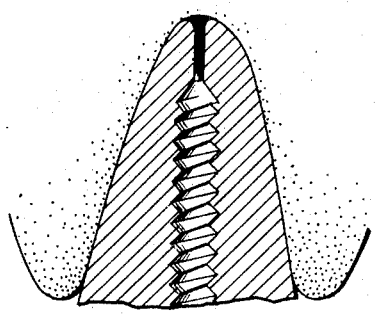
FIG. 4
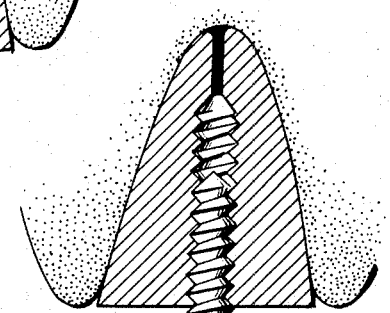
FIG. 5
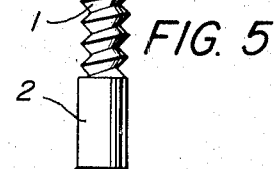
FIG. 6
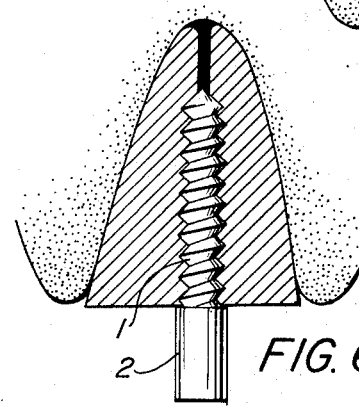
FIG. 7 IMPRESSION
INVENTOR
PETER FRANK KURER
BY Wolf, Greenfield & Sacks
ATTORNEYS

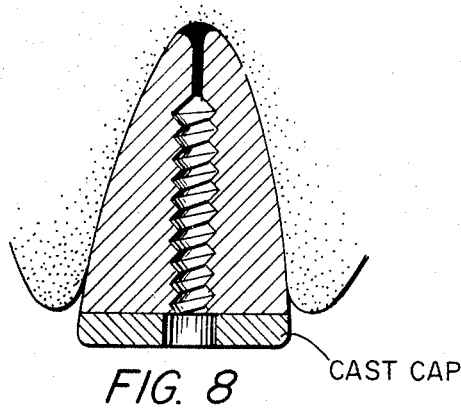
FIG. 8 CAST CAP
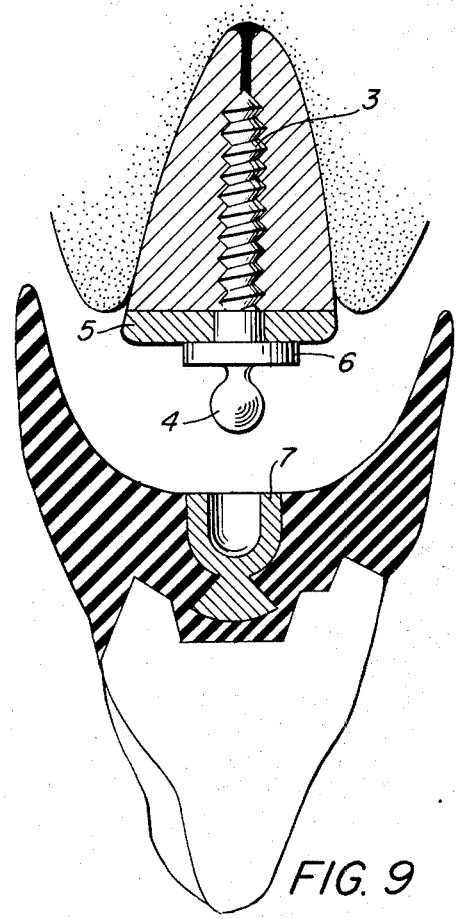
FIG. 9
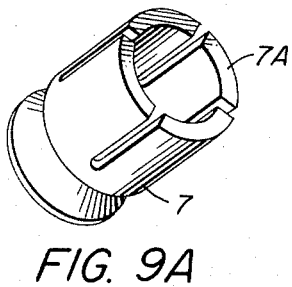
FIG. 9A
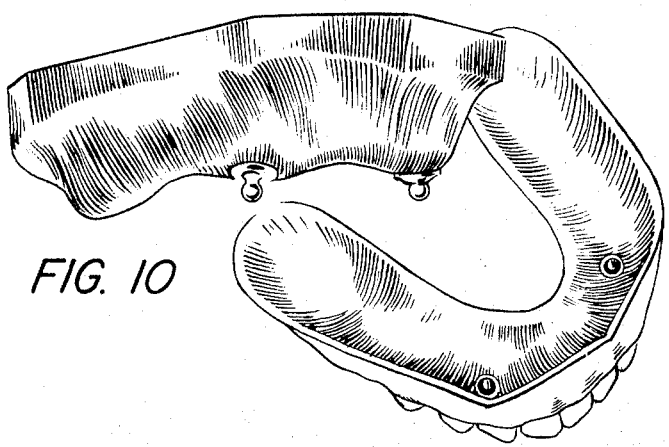
FIG. 10
INVENTOR
PETER FRANK KURER
BY Wolf, Greenfield & Sacks
ATTORNEYS

DENTURE RETENTION METHOD

FIELD OF THE INVENTION

This invention relates in general to the provision of means in the mouth to which a denture can be attached. More particularly, the invention pertains to a method in which the anchoring device to which the denture can be attached is secured to the stump of a natural tooth.

DISCUSSION OF THE PRIOR ART

Prior methods of providing devices in the mouth to which a denture could be attached have utilized pins cemented in the roots of natural teeth. In the practice of one such prior method, the tooth root canal is first prepared to receive a pin, an impression is taken of the prepared canal and the face of the tooth root. From the impression an integral pin and cap is cast in a metal such as gold and the denture retaining member is attached to the cap by solder. The pin and cap are then cemented to the tooth root. Due to the forces exerted by the denture on the retainer, such units have exhibited a tendency to come loose from the tooth root. Where the pin of the conventional anchor is tapered, it is reasonably well adapted to withstand compressive forces because the taper prevents the pin from being driven further into the canal which has a matching taper. However, whether tapered or straight, the pin of the conventional anchor is poorly adapted to withstand forces which place it in tension as the stress is then placed almost entirely upon the cement bond.

OBJECTIVES OF THE INVENTION

The primary objective of the invention is to provide a method by which a denture retaining device can be anchored in the stump of a natural tooth root in a manner which resists both compressive and tension forces. A further object of the invention is to provide a method which secures the cap protecting the root face.

SUMMARY OF THE INVENTION

In carrying out the method of the invention, the tooth root canal is enlarged by drilling and the enlarged hole is tapped to form threads on the wall. A "temporary" post having a cylindrical head and a threaded shank is screwed into the tapped hole until only the head protrudes above the tooth root. An impression is then taken of the root face and the protruding head and a cap is prepared having a hole in it where the head projection occurred. The temporary post may be removed from the tooth root before the cap is fitted onto the root or it may be removed after the cap is fitted. A "permanent" post having its head in the form of a denture retainer is then employed to replace the temporary post. The permanent post has a threaded shank which duplicates the threaded shank of the temporary post. The threaded shank of the permanent post is coated with dental cement. The shank is inserted through the hole in the cap and is screwed into the tooth root. Preferably, there is sufficient clearance between the cap and the post to permit excess cement to escape. When fully screwed into the tooth root, the head of the permanent post seats against the cap and completely covers the hole in the cap. The head of the post may form either the male or female portion of the denture retainer. The threaded engagement between the tooth root and the shank of the post, in conjunction with the dental cement, provides a bond that is well adapted to resist the forces tending to loosen that bond. The head of the permanent post overlaps the cap and thus aids in securing the cap to the tooth root.

THE DRAWINGS

The invention can be better understood from the exposition which follows when it is considered in conjunction with the accompanying drawings, in which FIG. 1 depicts the stump of a natural tooth, FIG. 2 shows the step of enlarging the canal in the tooth root, FIG. 3 depicts the step of forming threads in the tooth root, FIG. 4 shows the prepared tooth root, FIG. 5 illustrates the temporary post inserted in the prepared tooth root, FIG. 6 depicts the taking of an impression of the face of the tooth root and the protruding post head, FIG. 7 shows the cap secured to the tooth root, FIG. 8 depicts the permanent post secured to the tooth root, FIG. 9 shows the attachment of the denture to the male retainer on the permanent post, and FIG. 9A shows the details of the female portion of the retainer.

FIG. 10 shows a permanent post having its head formed to act as the female portion of the denture retainer.

THE EXPOSITION

Referring now to FIG. 1 of the drawings, a tooth root is depicted from which the crown has been broken off. The pulp is assumed to have been removed and the apex of the tooth root canal is assumed to have been filled in the conventional manner. The tooth root is prepared by the customary dental techniques to bring its face approximately level with the line of the gum. As indicated in FIG. 2, the canal is excavated by reaming or drilling to form a bore of uniform diameter extending well into the tooth root. Threads are then cut into the wall of the bore by means of a tapping tool, as shown in FIG. 3. Because of the fragile nature of the dentine, care should be taken to use a sharp tapping tool to which only light hand pressure is applied. Where resistance is encountered the tap should be unscrewed, cleaned with a burr brush, and re-inserted in the bore. This procedure is recommended until the cutting of the threads into the wall is completed. Preferably, the threads are deeply cut into the wall to insure adequate strength to resist tension forces. If desired, the threads can be of the buttress type for greater strength than that afforded by the usual V thread. The prepared root with a V thread is shown in cross-section in FIG. 4. A temporary post, shown in FIG. 5, having a shank 1 that is threaded to mate with the threads in the tooth root is screwed into the root. Where the shank is too long, it is shortened by trimming the threaded end until the shank exactly fits the prepared root. The temporary post has a cylindrical head 2 atop the threaded shank and when the temporary post is properly positioned in the root only the cylindrical head protrudes from the tooth root. With the temporary post properly positioned, as shown in FIG. 6, an impression is taken of the face of the tooth root and the protruding head of the temporary post. The impression can be taken in any conventional dental impression material customary in dental practice. On the model made from the impression, a cap is prepared having a hole in it where the cylindrical head of the post is projected from the root. The cap is set in place on the face of the tooth root. The temporary post may be separated from the tooth root before the cap is installed upon the tooth root. However, the temporary post is useful as a guide for positioning the cap, and may, if preferred, be removed after the cap is set in place on the tooth root.

After the cap is secured to the tooth root, a permanent post, shown in FIG. 9, is utilized in place of the temporary post. The permanent post has a threaded shank 3 which is trimmed to match the length of the shank of the temporary post. Atop the threaded shank, and preferably integral with it, is the precision dental retainer 4, here shown in the form of a ball anchorage. The threaded shank of the permanent post is coated with dental cement. The shank is then inserted through the hole in the cap 5 and the post is rotated to screw the shank into the tooth root. To permit the excess cement to escape, it is preferable to have a slight clearance between the tooth post and the hole in the cap. The head of the post has a collar 6, and when the shank is fully inserted in the tapped hole, the collar overlaps the hole in the cap and sits upon the cap to seal that hole. Inasmuch as the collar holds the cap against the face of the tooth root, when the cap is coated with dental cement, the collar may be relied upon to hold the cap in place and promote the formation of a tight bond between the cap and the tooth root.

The denture, as indicated in Fig. 9, is equipped with a member 7 which fits over and grips the ball anchorage of the permanent post. The member 7, depicted in FIG. 9A, is a sleeve having spring fingers 7A formed by slits in the sleeve. When the sleeve is pressed down upon the ball anchorage, the spring fingers spread to receive and clamp the ball.

As indicated in FIG. 10, it is often possible to provide the denture with two retaining members and to fit the stumps of two teeth with ball anchorages.

While the permanent post has been here described as carrying the ball anchorage, it is obvious that the permanent post can carry the female portion of the retainer and the male portion can be situated on the denture.

What is claimed is:

1. A method for providing a secure anchor in the mouth to which a denture can be attached, comprising the steps of
   a. drilling and tapping a hole in a tooth root to receive a post having a shank with mating threads,
   b. screwing the threaded shank of a temporary post into the tapped hole so that the cylindrical head of the temporary post protrudes from the tooth root,
   c. making an impression of the face of the tooth root and the protruding head of the temporary post,
   d. from the impression, preparing a cap having a hole in it where the protruding head occured,
   e. removing the temporary post,
   f. securing the cap to the face of the tooth root, and
   g. securing to the tooth root, through the hole in the cap, a permanent post having a threaded shank carrying atop it a denture retainer.

2. The method according to claim 1, wherein the permanent post has a collar surmounting the threaded shank and wherein in step (g) the permanent post is screwed into the tooth root to cause the collar to seat upon the cap.

* * * * *

UNITED STATES PATENT AND TRADEMARK OFFICE
CERTIFICATE OF CORRECTION

PATENT NO. : 3,656,236
DATED : April 18, 1972
INVENTOR(S) : Peter F. Kurer

It is certified that error appears in the above-identified patent and that said Letters Patent are hereby corrected as shown below:

In the heading, under "inventor" delete "Cheadle" of the address and
    insert --Manchester--
Column 2, line 3, delete "FIG. 5" insert --FIGS. 5 and 6--; delete
    "illustrates" insert --illustrate-- line 4, delete "prepared"

line 5, delete "6" insert --7-- line 7, delete "7" insert --8-- line 8, delete "FIG. 9" insert --and--

Signed and Sealed this

Eighth Day of April 1980

[SEAL]

Attest:

SIDNEY A. DIAMOND

Attesting Officer    Commissioner of Patents and Trademarks